June 28, 1932.  H. P. SPARKES  1,864,677
STROBOSCOPIC WATTHOUR METER
Filed Jan. 5, 1929
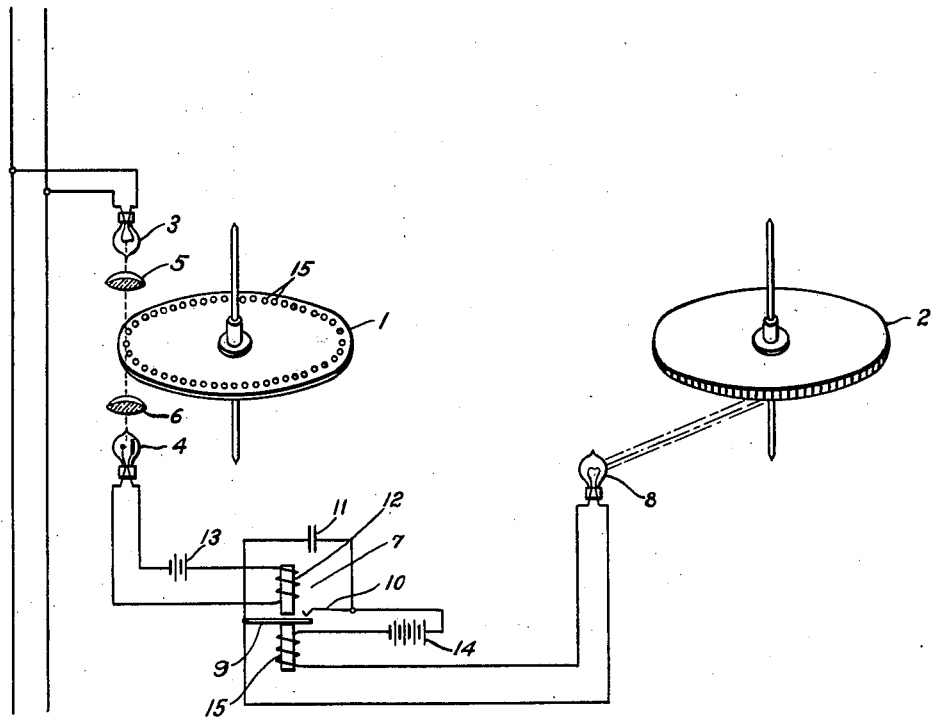
INVENTOR
*Harry P. Sparkes.*
BY
*Wesley G. Carr*
ATTORNEY Patented June 28, 1932

1,864,677

UNITED STATES PATENT OFFICE

HARRY P. SPARKES, OF PITTSBURGH, PENNSYLVANIA, ASSIGNOR TO WESTINGHOUSE ELECTRIC & MANUFACTURING COMPANY, A CORPORATION OF PENNSYLVANIA

STROBOSCOPIC WATTHOUR METER

Application filed January 5, 1929. Serial No. 330,585.

My invention relates to meter-testing devices and more particularly to testing devices for modern watthour meters having rotating-disc armatures.

My invention has for an object to provide a method of, and means for, quickly and accurately synchronizing the rotating element of a test watthour meter with the rotating element of a standard watthour meter in such manner that no load is placed on either of said rotating elements.

Briefly speaking, my invention comprises means for generating electric impulses in accordance with the speed of the rotating element of the standard watthour meter by means of a photo-electric cell and a light beam coacting with said element and intermittently lighting a neon lamp that is placed near the stroboscopically marked disc of the test meter in accordance with said electric impulses.

My invention may be more readily understood, however, if the accompanying drawing is referred to in connection with the following description:

The single figure of the accompanying drawing is a diagrammatic representation of my apparatus for stroboscopically comparing the speeds of two rotating elements.

In the drawing, the rotating element 1 of a standard watthour meter and the rotating element 2 of the test watthour meter are respectively actuated in accordance with their electromagnets (not shown) which may be connected to measure the same load.

As illustrated in the drawing, the periphery of the disc 2 is provided with a series of equally-spaced light-absorbing and light-reflecting surfaces.

A source of light 3, such as a modern incandescent lamp, is positioned to direct a beam of light through holes or openings near the periphery of the disc 1 of a standard watthour meter on a photo-electric cell 4. The latter is so positioned that the beam of light from the lamp 3 is projected upon it every time an opening in the periphery of the disc 1 presents itself between the lamp 3 and the cell 4. Light-converging and dispersing lenses 5 and 6 are provided, respectively, in the path of the light from the lamp to the openings in the disc 1, and in the path of the light from the openings in the disc 1 to the photo-electric cell 4, to insure the positive operation of the latter.

As the disc 1 rotates, the light-stopping and the light-passing portions of its surface alternately pass the focal point of the lens 5 and, hence, alternately stop and pass the light flux emanating from the lamp 3. Such alternative passage of the light produces an intermittent lighting of the photo-electric cell 4 which is proportional to the speed of rotation of the disc 1. The photo-electric cell 4, in turn, generates electric-current impulses that are proportional, in number to the speed of rotation of the disc 1.

The pulsating current produced by the photo-electric cell 4 is amplified by means of any suitable amplifying unit, as, for example, by a relay 7 of sufficient strength to energize a neon lamp 8. I prefer to use a neon lamp in this connection because the character and quality of the rays produced thereby are especially suitable for stroboscopic purposes.

The relay 7 comprises an armature 9 that forms a contact member coacting with a stationary contactor 10. A spark-absorbing condenser 11 is connected across the contactors 9 and 10. The armature 9 is actuated by an electromagnet 12 which is energized by a battery 13 every time the photo-electric cell 4 is exposed to a beam of light from the lamp 3.

The operation of the armature 12 establishes a circuit including a battery 14, electromagnet 15 and the lamp 8 which momentarily energizes the latter and energizes the electromagnet 15 to reopen the contact between the armature 9 and the contactor 10.

The lamp 8 is thereby lighted every time an opening 15 in the disc 1 presents itself between the lamp 3 and the photo-electric cell 4.

The neon lamp 8 is preferably so positioned with respect to the disc 2 of the test watthour meter that the stroboscopic action between the intermittent light of the lamp 8 and the light-absorbing and light-reflecting portions on the periphery of the disc 2 may be readily observed.

Since the frequency of the light pulsations of the neon lamp 8 is proportional to the speed of rotation of the disc 1 of the standard watthour meter, a stroboscopic synchronism is established between the disc 2 and the neon lamp 8 by virtue of which the speed of the disc 2 is made exactly equal to that of the disc 1 or, as it is commonly termed, the two discs may be synchronized by changing the load adjustments of the disc 2.

Since the speed of the disc 1 is standard, the speed of the disc 2 is made equal to it at both light loads and full loads, and the latter is thereby calibrated quickly and efficiently with reference to the former, both of said meters being connected to the same load.

I consider my method to be a great improvement upon prior methods of watthour-meter testing in that the time element necessary for test purposes is greatly reduced and elimination is made of the need for calibration by trial for any particular number of revolutions.

While I have disclosed my invention as particularly applicable for use in connection with the testing of watthour meters, it will be understood that it is useful in connection with synchronizing corresponding parts of any rotating machine.

I claim as my invention:

1. In combination, a movable element having alternate light-transmitting and light-retarding areas of predetermined length along a path of movement thereof, a light-sensitive device for generating electrical impulses, means for directing light toward said device through the intermediary of said areas to cause said impulses, a second movable element having alternate light-absorbing and light-reflecting surfaces along a path of movement thereof, a luminous electrical discharge device for illuminating said second element, and means for amplifying said impulses to energize and deenergize said discharge device.

2. In combination, a rotating element having equi-spaced alternate light-transmitting and light-retarding areas around a periphery thereof, a photo-electric cell, means for directing light toward said cell through the intermediary of said areas to create impulses in the cell, a second rotating element having equi-spaced alternate light-absorbing and light-reflecting surfaces around a periphery thereof, a luminous electrical-discharge device for illuminating said second element, and means for amplifying said impulses to energize and de-energize said discharge device in accordance with the speed of said first element.

3. In combination, a rotating element having equi-spaced alternate light-transmitting and light-retarding areas around a periphery thereof, a photo-electric cell, means for directing light toward said cell through the intermediary of said areas to create impulses in the cell, a second rotating element having equi-spaced alternate light-absorbing and light-reflecting surfaces around a periphery thereof, a luminous electrical-discharge device for illuminating said second element, and means for amplifying said impulses to energize and de-energize said discharge device in accordance with the speed of said first element including a source of energy for said discharge device, contact members in the circuit of said source, and means responsive to said impulses for mechanically engaging and disengaging said contact members.

In testimony whereof, I have hereunto subscribed my name this 2nd day of January, 1929.

HARRY P. SPARKES.